United States Patent [19]
Stevens et al.

[11] Patent Number: 5,345,895
[45] Date of Patent: Sep. 13, 1994

[54] LIVESTOCK FEEDER WAGON WITH VERTICALLY FLEXING INNER RACK

[76] Inventors: Douglas L. Stevens, 2304 Skyline Dr.; Robert L. Wiese, R.R. #4, Box 264, both of, Norfolk, Nebr. 68701

[21] Appl. No.: 184,836

[22] Filed: Jan. 21, 1994

[51] Int. Cl.⁵ .............................................. A01K 5/00
[52] U.S. Cl. .................................... 119/58; 119/60
[58] Field of Search ...................... 119/58, 60, 51.01

[56] References Cited

U.S. PATENT DOCUMENTS

| | | | |
|---|---|---|---|
| 329,029 | 10/1885 | Dye | 119/58 |
| 4,078,523 | 3/1978 | Etzler | 119/58 |
| 4,258,663 | 3/1981 | Schoessow | 119/58 |
| 5,092,273 | 3/1992 | Meyer | 119/58 |
| 5,178,096 | 1/1993 | Lock | 119/58 |

FOREIGN PATENT DOCUMENTS 2489222  3/1982  France ................................ 119/58

*Primary Examiner*—John G. Weiss
*Attorney, Agent, or Firm*—John A. Beehner

[57] ABSTRACT

A livestock feeder wagon includes a floor having as peripheral side wall extended upwardly therefrom to define a shallow open-topped manger for receiving and dispensing a variety of feeds. A peripheral outer rack extends upwardly from adjacent the periphery of the manger and includes a plurality of horizontally spaced apart upright outer bars, each adjacent pair defining a first feed opening. An inner rack is situated interiorly of the outer rack and includes a plurality of horizontally spaced apart inner bars extending downwardly and inwardly from the outer rack with each adjacent pair of inner bars defining a second feed opening. The lower end of each inner bar extends through a respective hole in the floor of the wagon in slide fit relation so that the inner bar is free to flex through a limited vertical movement relative to the floor whereby the inner rack acts as a shock absorber to protect both the feeder wagon and the livestock.

18 Claims, 4 Drawing Sheets

LIVESTOCK FEEDER WAGON WITH VERTICALLY FLEXING INNER RACK

BACKGROUND OF THE INVENTION

1. Technical Field

The present invention is directed generally to a livestock feeder wagon and more particularly to an improved feeder wagon having horizontally spaced apart inner and outer racks through which livestock project their head for consuming feed in the wagon, the inner rack having a plurality of inner bars extending downwardly and inwardly from the outer rack and extending through holes in the wagon floor so as to be free to flex through limited vertical movement relative to the floor.

2. Description of the Prior Art

Portable livestock feeders with an elongated floor surface having a raised center ridge to move feed outwardly toward the sides, shallow side walls to contain feed and some type of dividers extending upwardly from the side walls to form separate feed openings are well known in the art. Prior patents disclosing such feeder wagons include Feteral, U.S. Pat. No. 3,782,333 and Schoessow, U.S. Pat. No. 4,258,663. Another such wagon was built and used by Allan Stark in Minnesota in the early 1970's. Both the Stark and Schoessow feeder wagons included similar arrangements of inner and outer racks for controlling the dispensing of feed from the wagons. The outer rack included a series of slant bars arranged in a vertical plane above the side walls and the inner rack consisted of a series of downwardly and inwardly sloped inner bars rigidly secured to the floor interiorly of the side walls.

Two problems associated with such prior feeder wagons are (1) high stress at the juncture of the inner bars and the floor, and (2) lack of adequate drainage from the pan or floor of the wagon. The first problem results from substantial vertical and horizontal loads placed on the inner bars by such heavy feeds as large round hay bales which may weigh up to 2 tons. The vertical forces from the weight of the bale are transferred through the inner bars to the floor. Outward forces resulting from the bale being wedged between oppositely inclined inner bars likewise result in high stress at the juncture of the inner bars and floor. The problem is compounded by the fact that such feeder wagons are often designed as unibody construction without a frame to reinforce the floor adjacent the connections to the inner bars. Such stress can result in broken welds with rusty jagged edges exposed to the livestock.

A related problem of feeder wagons having rigid inner and outer racks is the stress on the animals resulting from abutment of their heads, particularly against the inner bars, when feeding. Such rigid bars have been known to trap animals such as horned cattle, resulting in injury and death.

Accordingly, a primarily object of the present invention is to provide an improved livestock feeder wagon.

Another object is to provide a livestock feeder wagon having an inner rack of downwardly and inwardly inclined inner bars with freedom of vertical flexing movement relative to the floor of the feeder for shock absorption to minimize stress both on the wagon and livestock.

Another object is to provide such a feeder wagon wherein the bars of the inner rack extend through holes in the floor of the feeder which perform the dual function of assuring adequate drainage.

Another object is to provide such a feeder wagon which is simple and rugged in construction, economical to manufacture and efficient in operation.

SUMMARY OF THE INVENTION

The livestock feeder wagon of the present invention includes a flat horizontal floor having a substantially continuous peripheral side wall to define a shallow open topped manger for receiving and dispensing a variety of feeds. A peripheral outer rack extends upwardly from adjacent the periphery of the manger and includes a plurality of horizontally spaced apart upright outer bars, each adjacent pair of which define a first feed opening through which livestock standing on the ground adjacent the feeder may project its head to consume feed in the manger. An inner rack is situated interiorly of the outer rack and includes a plurality of horizontally spaced apart inner bars extending downwardly and inwardly from the outer rack. Each adjacent pair of inner bars defines a second feed opening through which livestock may consume feed supported in the manger interiorly of the inner rack.

The floor has at least two rows of holes, each row extended longitudinally of the floor at a position spaced interiorly from the peripheral side wall. The lower end portion of each inner bar extends through a respective one of the holes in slide fit relation such that the inner bar is free to flex through a limited vertical movement relative to the floor.

The feeder wagon is preferably supported on ground wheels including front steerable wheels connected to an elongated tongue for connection to a towing vehicle.

The floor preferably includes a sufficient number of holes to slidably receive each of the inner bars. The holes are over sized relative to the inner bars so that the lower end portion of each inner bar is free for limited horizontal movement within its respective hole. A washer may be fixed to the underside of the floor in registered relation with each respective hole to reinforce the periphery of the hole. Likewise, a floating washer may encircle each respective inner bar above the floor so as to rest on the top surface of the floor around the respective inner bar. Finally, a stop means may be provided on the lower end portion of each inner bar at a position normally spaced below the underside of the floor so that the stop means is engageable with the reinforcing washer on the underside of the floor in response to upward flexing movement of the inner bar to limit the extent of that upper movement. The upper end of each inner bar is preferably rigidly connected to a horizontal upper frame member forming the top edge of the outer rack.

In the event that the wagon is to be used for granular or loose feed, the capacity of the wagon can be substantially increased by the addition of liner panels on the inner rack. Such panels are supported at a set fixed height above the floor by a combination of inverted T-shaped brackets engaged against the upper surface of alignment buttons fixed on the interior surfaces of the inner bars.

The flexible slide fit of the inner bars relative to the floor effects a shock absorber action which protects both the feeder wagon and livestock. Forces on the inner bars are absorbed by flexing of the bars themselves and by the relatively stronger upper frame member, rather than being directed to a relatively thin floor.

The relative flexibility of the inner bars furthermore softens the abutment of an animals head against the inner bars to protect against injury to livestock. Since the holes are oversized relative to the inner bars, drainage is afforded at multiple locations throughout the length of the floor of the feeder wagon on both sides of the raised center ridge.

DESCRIPTION OF THE PREFERRED EMBODIMENT

Figure 1:
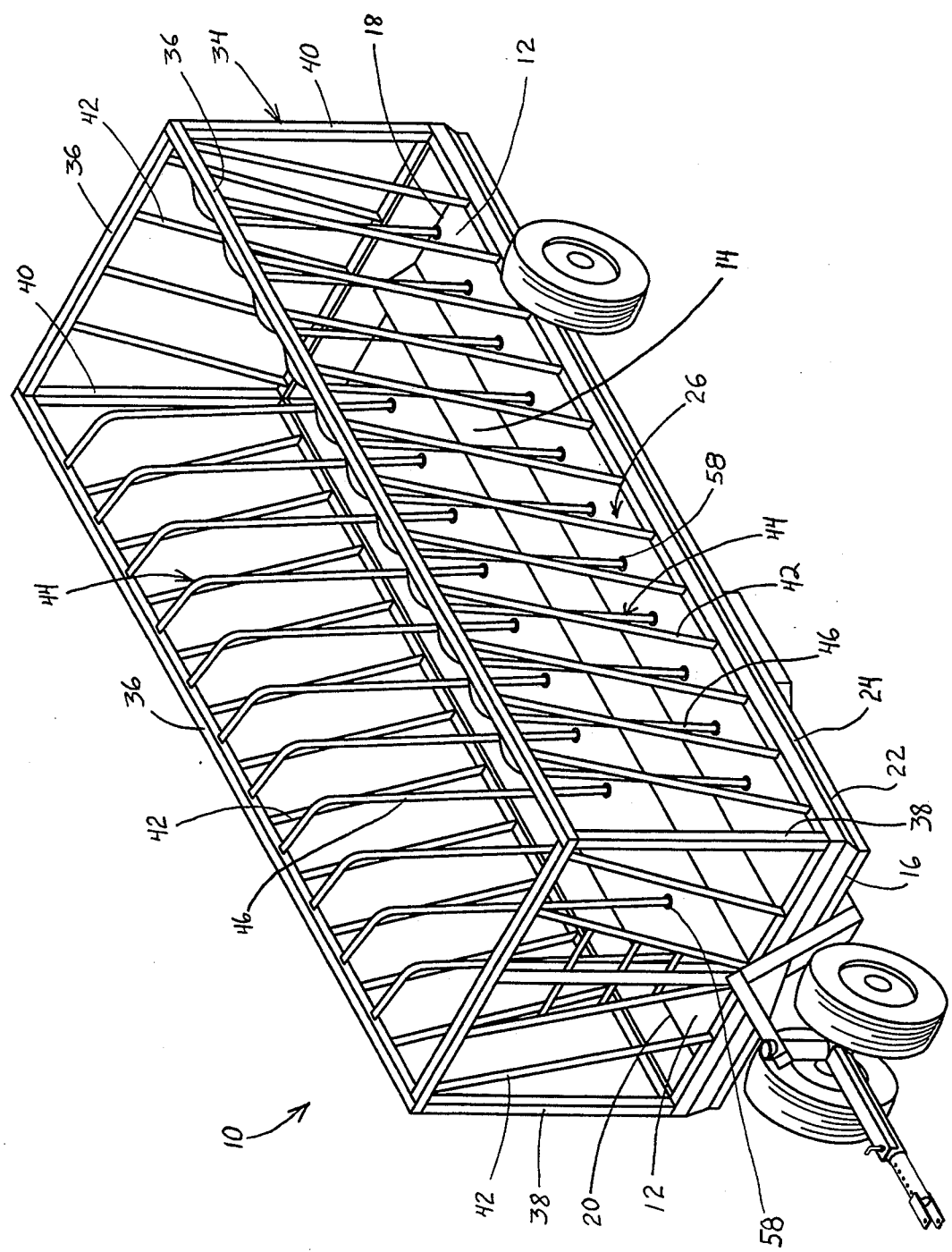
FIG. 1 is a perspective view of a feeder wagon of the invention.
Figure 2:
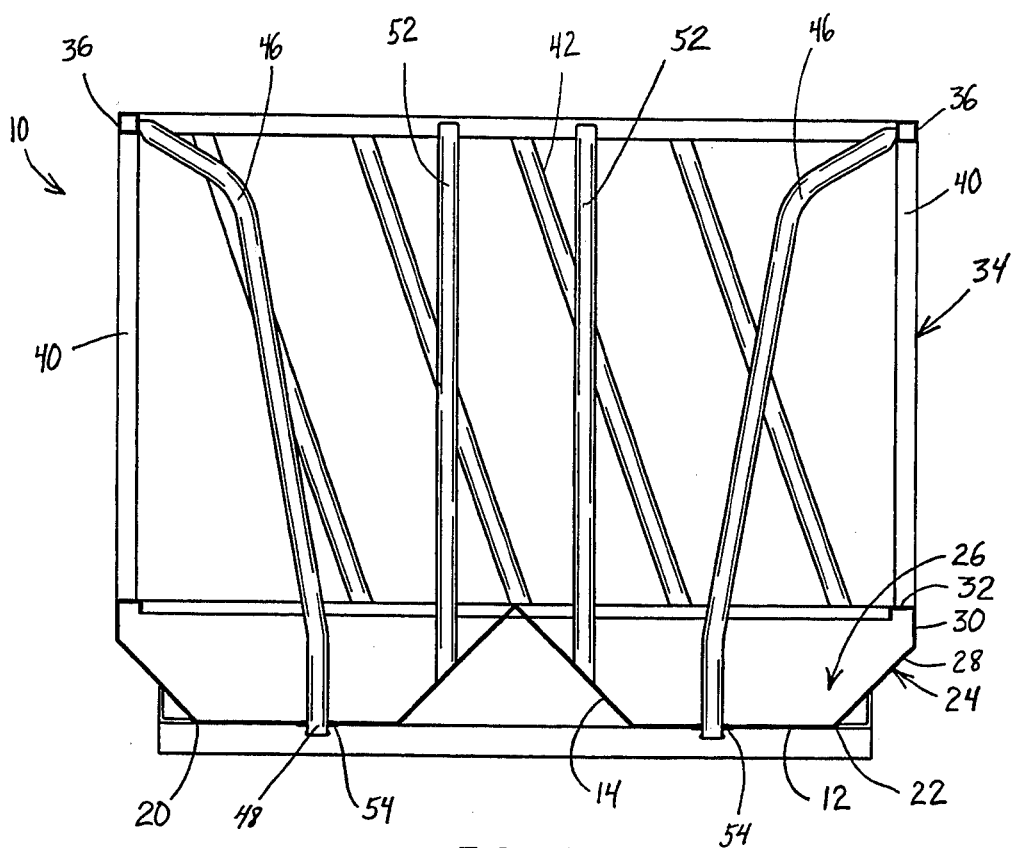
FIG. 2 is a partial enlarged front sectional view thereof.

The livestock feeder wagon 10 of the present invention is illustrated in FIGS. 1 and 2 as including a generally flat horizontal floor 12 which may be integrally formed with an elongated raised center ridge 14 to assist in directing feed outwardly toward the sides of the feeder. Adjacent the forward and rearward ends 16 and 18 and both opposite side edges 20 and 22 of the feeder, a substantially continuous peripheral side wall 24 is connected to and extends upwardly from the floor to define a shallow open topped manger 26 for receiving and dispensing a variety of feeds. Referring to FIG. 2, side wall 24 preferably includes an upwardly and outwardly slanted lower portion 28 for eliminating a right angle joint with the floor where feed may be inaccessible. The slanted lower portion 28 merges into a vertical medial portion 30 connected to an inwardly and downwardly bent top flange 32 which prevents livestock from dragging feed up and over the edge of the side wall.

A peripheral outer rack 34 extends upwardly from adjacent the periphery of the manger 26. The outer rack on each side and end of the wagon preferably includes an upper frame member 36 supported by front and rear support posts 38 and 40 which are secured and supported on the manger 26. The outer rack furthermore includes a plurality of horizontally spaced apart upright outer bars 42 with each adjacent pair of outer bars defining a first feed opening therebetween through which livestock standing on the ground adjacent the feeder may project its head to consume feed in the manger 26. The outer bars 42 may be slanted as illustrated in FIGS. 1 and 2 for the purpose of requiring an animal to cock its head for withdrawal from the outer rack thereby discouraging the animal from dragging feed from the wagon. The outer rack 34 preferably spans both sides and both ends of the feeder wagon as illustrated.

Figures 3, 4:
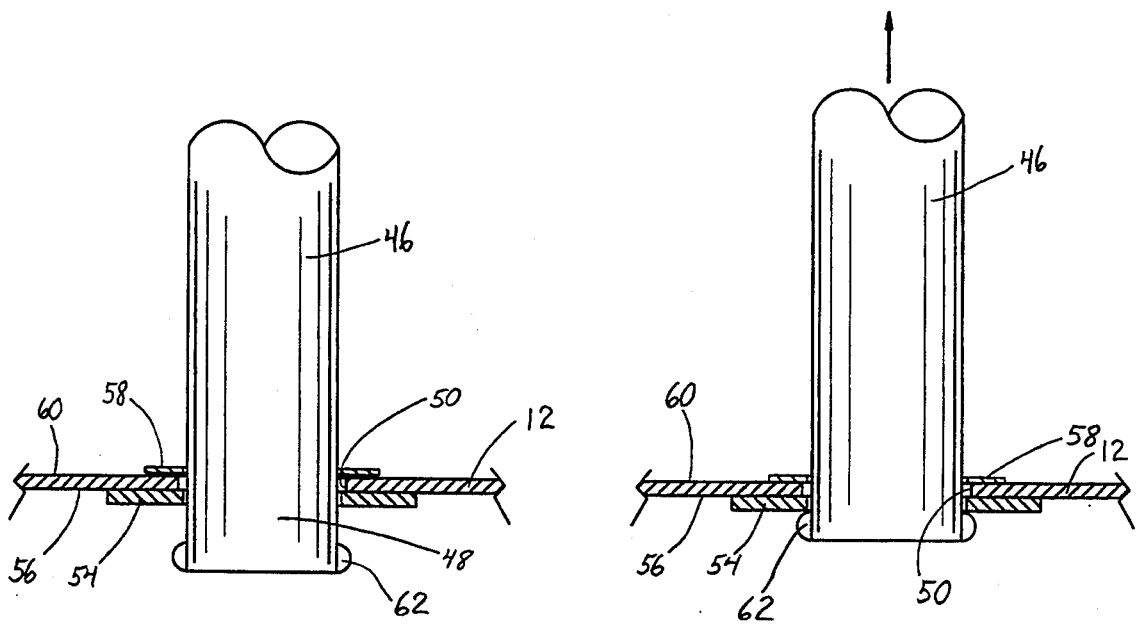
FIG. 3 is a partial enlarged detail sectional view showing the normal position of the lower end of an inner bar extended through a respective hole in a wagon floor.
FIG. 4 is a partial enlarged detail sectional view similar to FIG. 3 but with the inner bar flexed upwardly with the stop means engaging the underside of the wagon floor.
Figure 5:
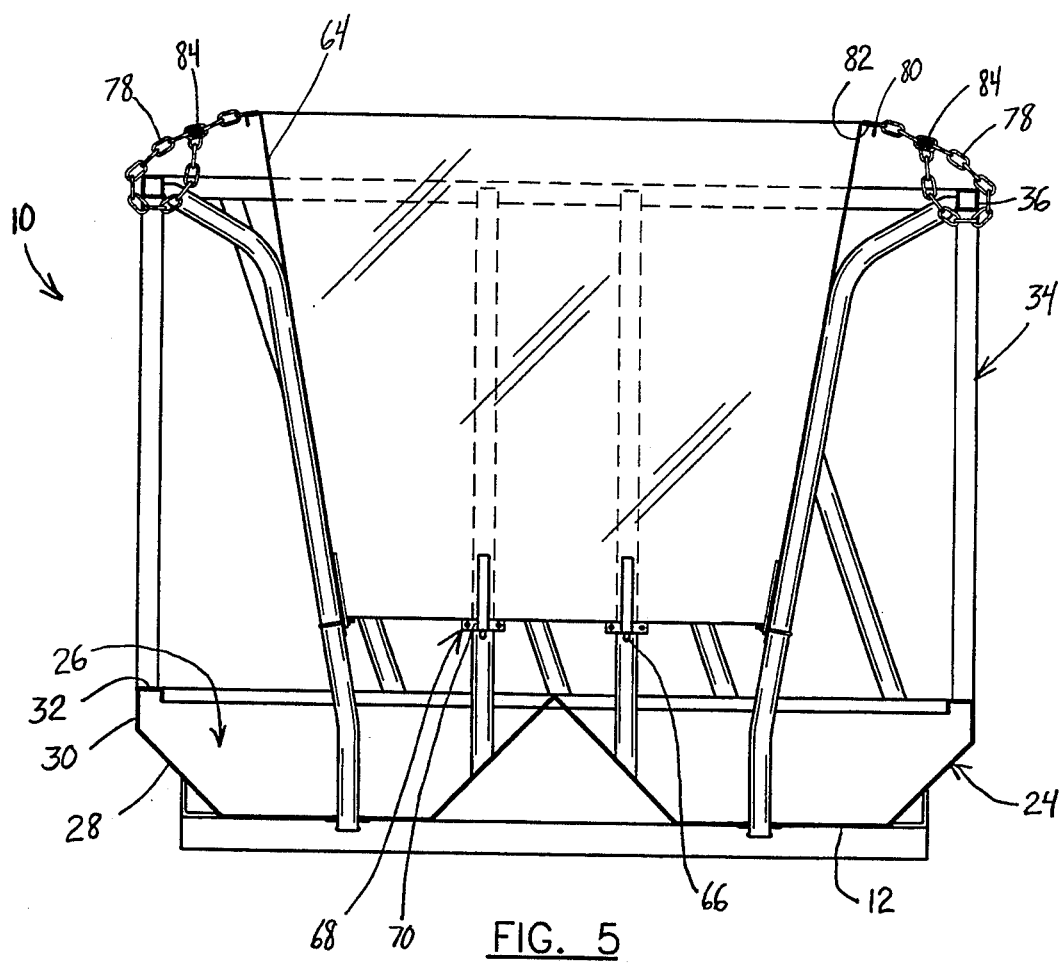
FIG. 5 is a partial front sectional view, similar to FIG. 2, but with liner panels supported on the inner racks.
Figure 6:
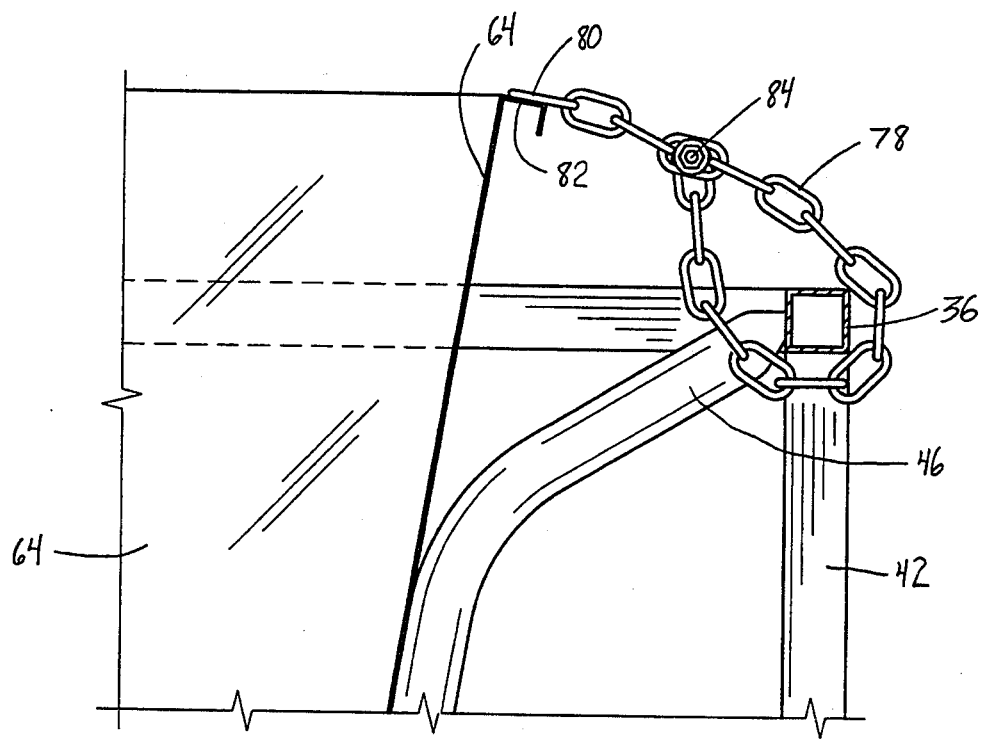
FIG. 6 is a partial enlarged front sectional view showing a chain for connecting the upper edge of the liner panel to the adjacent upper frame member.
Figure 7:
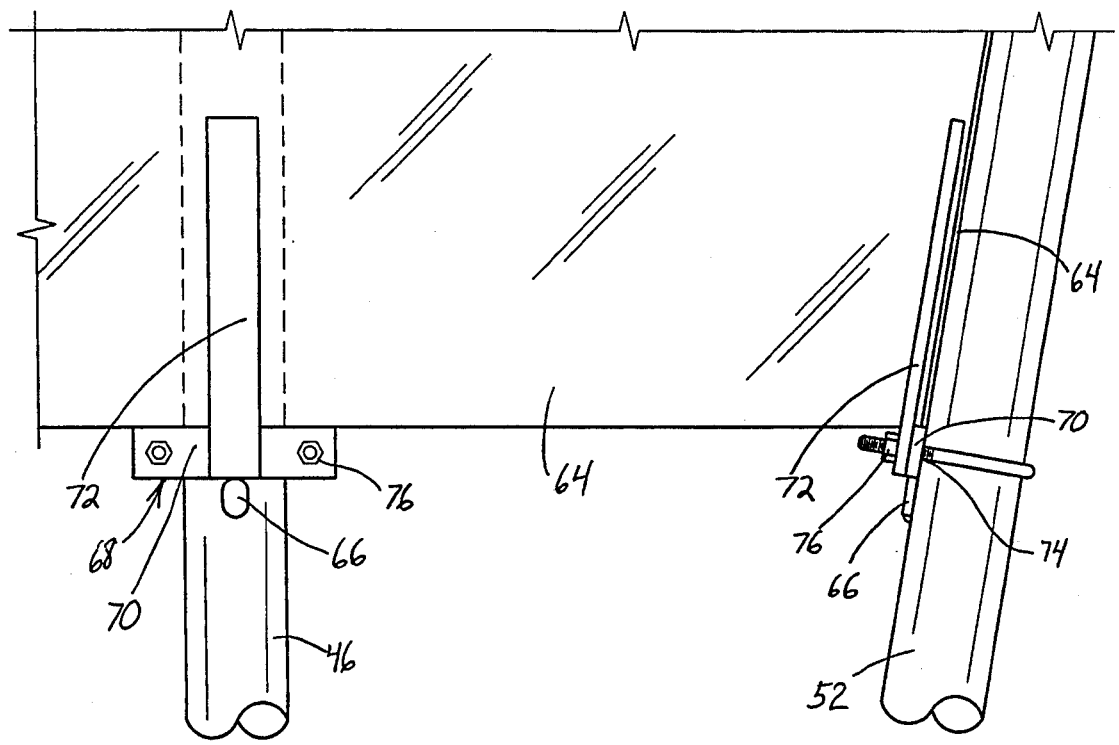
FIG. 7 is a foreshortened partial side view showing the liner panel means at one corner of the wagon.

An inner rack 44 is situated interiorly of outer rack 34 and includes a plurality of horizontally spaced apart inner bars 46 which extend downwardly and inwardly from the outer rack. Each adjacent pair of inner bars 46 defines a second feed opening through which livestock may consume feed supported in the manger 26 interiorly of the inner rack. The upper ends of the inner bars 46 are preferably rigidly secured to the outer rack 34. In the illustrated embodiment, the round section tubing of each inner bar 46 is welded to the interior face of the square section tubing of the upper frame member 36. The lower end portion 48 of each inner bar 46 extends through a respective hole 50 in the feeder wagon floor 12 in slide fit relation such that the inner bar 46 is free to flex through a limited vertical movement relative to the floor as illustrated in FIGS. 3 and 4. The holes 50 are preferably arranged on the floor in a pair of rows, each row extended longitudinally of the floor at a position spaced interiorly from the peripheral side wall 24. Similar holes are spaced inwardly from the end walls to accommodate the inner bars 52 extending downwardly and inwardly from the rearward end of the feeder wagon as illustrated in FIG. 2.

The floor preferably includes a sufficient number of holes to receive each of the respective inner bars 46 and 52. The holes 50 are preferably oversized relative to the inner bars 46 and 52 so that the lower end portion of each inner bar is free for limited horizontal movement within the respective hole 50 through which it extends. Each oversized hole 50 also provides the further function of affording drainage from the area of the floor surrounding the hole.

Referring specifically to FIGS. 3 and 4, a reinforcing washer 54 is fixed to the underside 56 of floor 12 in registered relation with a respective hole 50. Each reinforcing washer 54 preferably has an inside diameter which is oversized relative to the tubular inner bar extending therethrough although that inside diameter may be slightly less that the diameter of the associated hole 50.

Each inner bar 46 and 52 also preferably has a floating washer 58 encircling it and freely slidable on the inner bar above the floor 12 so that it rests on the top surface 60 of the floor 12 around the respective inner bar 46 or 52.

Finally, each inner bar 46 and 52 has a stop means 62 adjacent its lower end. The stop means 62 has a horizontal extent greater than width of the hole 50 through which its respective inner bar extends so that the stop means is engageable with the respective reinforcing washer 54 on the underside of the floor in response to upward flexing movement of the respective inner bar to limit that upward movement. Whereas the stop means 62 may take various forms, the preferred form is a length of #9 wire wrapped around and tack welded to the lower end of the inner bar at a position in spaced relation below the reinforcing washer when the inner bar is in a normal non-load bearing position as indicated in FIGS. 2 and 3. When the upper frame members 36 are flexed outwardly such as when a large round bale is dropped into the feeder wagon, the inner bars are drawn upwardly relative to their respective holes but only to the extent of engagement of the stop means 62 against reinforcing washer 54 so that the inner bars cannot be completely withdrawn from the holes 50.

Whereas specific dimensions are not critical to the present invention, an acceptable embodiment includes inner bars 46 made of steel tubing having an outside diameter of two inches. The reinforcing washer 54 has a two and one eighth inch inside diameter, a four and a half inch outside diameter and a thickness of three sixteenth inches. The floating washer 58 is a bushing washer having a two and a half inch inside diameter, a three and an eighth inch outside diameter and a fourteen gauge thickness. The vertical spacing between the stop means 62 and reinforcing washer 54 in the normal position of FIGS. 2 and 3 is preferably approximately between one quarter inch and one half inch.

Figure 8:
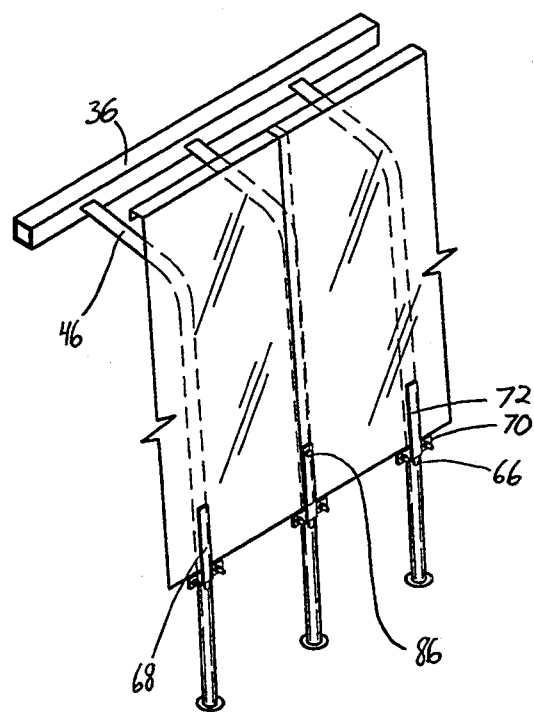
FIG. 8 is a reduced perspective view of a juncture between overlapped side panels.

The feeder wagon of the invention is designed for feeding a wide variety of feeds. Large round bales have already been discussed. Stacked hay, square bales and loose hay can likewise be fed from this wagon. It is also ideal for feeding green chop and silage. For loose flowable feeds, the capacity of the feeder wagon can be increased by securing liner panels 64 to the inner bars. The bottom edge of the liner panel 64 is fixed at a set height above the peripheral side wall 24 since the flow angle of most grains and other loose feeds will assure that the feed does not spill over the side walls 24. To support the liner panels at a fixed uniform height, each inner bar has an alignment button fixedly secured on an interior surface thereof. An inverted T-shaped bracket 68 has a lower cross bar 70 adapted to rest on the alignment button 66 and an upright stem 72 secured to a front surface of the cross bar 70 by welding or the like and extended upwardly therefrom so that the liner panel 64 is received between the stem 72 and inner bar 46 in support engagement on the lower cross member 70. To secure the inverted T-shaped bracket in place, a U-bolt encircles the respective inner bar and has the two legs thereof extended through spaced apart holes 74 in lower cross bar 70 for rigid securement thereto by nuts 76 or any other suitable fastening means. The top edges of the liner panel 64 preferably extend above the upper frame members 36 and are secured relative to the upper frame members by chains 78. Each chain has one end 80 secured to a turned out flange 82 along the top edge of each liner panel 64. The chain is then wrapped around the adjacent upper frame member 36 with the free end secured to itself by a nut and bolt fastener 84 or any other suitable fastener. For long wagons, it may be necessary to overlap separate side panels on each side of the inner rack as illustrated in FIG. 8. A securement bolt 86 may be directed through the overlapped panels and the adjacent inner bar 46 to rigidly support the panel at the intended fixed height determined by the alignment buttons 66.

Whereas the invention has been shown and described in connection with a preferred embodiment thereof, it is apparent that many modifications, substitutions and additions may be made which are within the intended broad scope of the appended claims. Thus there has been shown and described an improved livestock feeder wagon which accomplishes at least all of the stated objects.

I claim:

1. A feeder wagon for livestock, comprising, floor having forward and rearward ends and opposite side edges, a substantially continuous peripheral side wall connected to and extended upwardly from said floor adjacent the forward and rearward ends and opposite side edges thereof to define a shallow open topped manger for receiving and dispensing a variety of feeds, a peripheral outer rack extended upwardly from adjacent the periphery of said manger, said outer rack including a plurality of horizontally spaced apart upright outer bars, each adjacent pair of outer bars defining a first feed opening therebetween through which livestock standing on the ground adjacent feeder may project its head to consume feed in said manger, an inner rack situated interiorly of said outer rack and including a plurality of horizontally spaced apart inner bars extending downwardly and inwardly from said outer rack, each adjacent pair of inner bars defining a second feed opening through which livestock may consume feed supported in said manger interiorly of the inner rack, said floor including a plurality of holes at positions spaced longitudinally apart and spaced interiorly from said peripheral side wall, each of said inner bars having a lower end portion extending through a respective one of said holes in slide fit relation such that said inner bar is free to flex through a limited vertical movement relative to said floor, and wheel means for supporting said floor in clearance relation above the ground for transport, said wheel means including steerable front wheels and a tongue operatively connected to said steerable front wheels and extended forwardly of said floor for connection to a towing vehicle.

2. The feeder wagon of claim 1 wherein said floor includes a sufficient number of holes to receive each of said respective inner bars.

3. The feeder wagon of claim 1 wherein said holes are oversized relative to said inner bars whereby the lower end portion of each inner bar is free for limited horizontal movement within the respective hole through which it extends.

4. The feeder wagon of claim 3 wherein said floor has a top surface and an underside and further comprising a plurality of reinforcing washers, each washer fixed to the underside of said floor in registered relation with a respective one of said holes, each washer having an inside diameter which is oversized relative to the inner bar extending therethrough.

5. The feeder wagon of claim 4 further comprising a plurality of floating washers, each floating washer encircling a respective inner bar and being freely vertically slidable on said inner bar, said floating washer being adapted to rest on the top surface of said floor around the respective inner bar.

6. The feeder wagon of claim 5 further comprising stop means on the lower end portion of each inner bar below said floor, said stop means having a horizontal extent greater than the width of the hole through which its respective inner bar extends whereby said stop mean is engageable with the respective reinforcing washer on the underside of said floor in response to upward flexing movement of the respective inner bar to limit said upward movement.

7. The feeder wagon of claim 6 wherein said stop means comprises a wire wrapped around and welded to the lower end portion of each inner bar.

8. The feeder wagon of claim 1 wherein each outer bar has an upper end and said peripheral outer rack further comprises a generally horizontal peripheral upper frame member rigidly secured to the upper ends of said outer bars, and a plurality of support posts connected to and extended between said upper frame member and said manger.

9. The feeder wagon of claim 8 wherein the upper end of each inner bar is rigidly connected to said upper frame member.

10. The feeder wagon of claim 8 further comprising liner panel means having top and bottom edges and means for supporting said liner panel means on said inner bars with the bottom edge of said liner panel means fixed at a set height above said peripheral side wall to support and contain loose and flowable feeds within said inner rack.

11. The feeder wagon of claim 10 wherein said means for supporting said liner panel means comprises a plurality of alignment buttons, one alignment button being fixedly secured to each respective inner bar on an interior surface thereof and an inverted T-shaped bracket including a lower cross bar adapted to rest on said alignment button and an upright stem secured to a front surface of the cross bar and extended upwardly therefrom whereby said liner panel means is received between said stem and inner bar in support engagement on said lower cross member.

12. The feeder wagon of claim 11 further comprising a U-bolt associated with each inverted T-shaped bracket, said lower cross member having two spaced apart holes and said U-bolt encircling the respective inner bar and extending through said spaced apart holes in the lower cross member and including fastening means for securing said lower cross member to said U-bolt.

13. The feeder wagon of claim 12 further comprising a plurality of flexible chains connected to said liner panel means adjacent the top edge thereof at horizontally spaced apart positions therealong, each chain having an outer end wrapped around said upper frame member and each chain including a fastener for securing the outer end to a medial portion of the chain for securing said top edge of the liner panel means to said upper frame member.

14. A feeder wagon for livestock comprising,
floor having forward and rearward ends and opposite side edges,
a substantially continuous peripheral side wall connected to and extended upwardly from said floor adjacent the forward and rearward ends and opposite side edges thereof to define a shallow open topped manger for receiving and dispensing a variety of feeds,
a peripheral outer rack extended upwardly from adjacent the periphery of said manger, said outer rack including a plurality of horizontally spaced apart upright outer bars, each adjacent pair of outer bars defining a first feed opening therebetween through which livestock standing on the ground adjacent feeder may project its head to consume feed in said manger,
an inner rack situated interiorly of said outer rack and including a plurality of horizontally spaced apart inner bars extending downwardly and inwardly from said outer rack, each adjacent pair of inner bars defining a second feed opening through which livestock may consume feed supported in said manger interiorly of the inner rack,
said floor including plurality of holes at position spaced longitudinally apart and spaced interiorly from said peripheral side wall,
each of said inner bars having a lower end portion extending through a respective one of said holes in slide fit relation such that said inner bar is free to flex through a limited vertical movement relative to said floor, and
means for supporting said floor in clearance relation above the ground.

15. The feeder wagon of claim 14 wherein said floor has a top surface and an underside and further comprising a plurality of reinforcing washers, each washer fixed to the underside of said floor in registered relation with a respective one of said holes, each washer having an inside diameter which is oversized relative to the inner bar extending therethrough.

16. The feeder wagon of claim 14 further comprising a plurality of floating washers, each floating washer encircling a respective inner bar and being freely vertically slidable on said inner bar, said floating washer being adapted to rest on the top surface of said floor around the respective inner bar.

17. The feeder wagon of claim 16 wherein said holes are oversized relative to said inner bars whereby the lower end portion of each inner bar is free for limited horizontal movement within the respective hole through which it extends.

18. The feeder wagon of claim 14 further comprising stop means on the lower end portion of each inner bar below said floor, said stop means having a horizontal extent greater than the width of the hole through which its respective inner bar extends whereby said stop means is engageable with the respective reinforcing washer on the underside of said floor in response to upward flexing movement of the respective inner bar to limit said upward movement.

* * * * *